United States Patent [19]

Page et al.

[11] Patent Number: 5,315,819
[45] Date of Patent: May 31, 1994

[54] POWER MANAGEMENT SYSTEM FOR TURBINE ENGINES

[75] Inventors: George W. Page, Gilbert; Glen T. High, Phoenix; David L. Looper, Chandler; James S. Frew; Larry C. Prevallet, both of Phoenix; Joseph W. Free, Mesa, all of Ariz.

[73] Assignee: Allied-Signal Inc., Morris Township, Morris County, N.J.

[21] Appl. No.: 762,322

[22] Filed: Sep. 17, 1991

[51] Int. Cl.$^5$ .............................................. F02C 9/28
[52] U.S. Cl. ................................. 60/39.282; 416/30
[58] Field of Search ............... 60/39.281, 39.282, 243; 416/25, 27, 28, 30

[56] References Cited

U.S. PATENT DOCUMENTS

| | | |
|---|---|---|
| 3,691,356 | 9/1972 | Miller . |
| 3,908,934 | 9/1975 | Schloeman . |
| 3,930,366 | 1/1976 | Nelson . |
| 3,963,372 | 6/1976 | McLain et al. . |
| 3,964,457 | 6/1976 | Coscia . |
| 3,969,890 | 7/1976 | Nelson . |
| 4,018,044 | 4/1977 | Joby et al. . |
| 4,185,460 | 1/1980 | Moore et al. ........................ 60/243 |
| 4,275,557 | 6/1981 | Marvin et al. . |
| 4,275,558 | 6/1981 | Hatch et al. . |
| 4,314,441 | 2/1982 | Yannone et al. . |
| 4,314,445 | 2/1982 | Lewis . |
| 4,346,288 | 8/1982 | Foster . |
| 4,414,807 | 11/1983 | Kerr . |
| 4,418,529 | 12/1983 | Joby . |
| 4,468,924 | 9/1984 | Moore ............................. 60/39.281 |
| 4,522,026 | 6/1985 | Peterson et al. ................. 60/39.282 |
| 4,593,523 | 6/1986 | Hawes . |
| 4,644,744 | 2/1987 | Mittendorf et al. . |
| 4,947,334 | 8/1990 | Massey et al. . |
| 5,001,646 | 3/1991 | Caldwell et al. . |

OTHER PUBLICATIONS

Treseder, R. C. *Requirements for Turboprop Propellers.* SAE Journal. Feb., 1949. pp. 26–29.

Primary Examiner—L. Casaregola
Attorney, Agent, or Firm—Hugh P. Gortler; James W. McFarland; Robert A. Walsh

[57] ABSTRACT

A power management system for turbine engines includes a plurality of switches, each allowing for engine speed and engine torque to be controlled together. The switches correspond to various modes of operation of the turbine engine. When a switch is selected, a mode signal is supplied to a FADEC which, in response, issues speed and torque commands to an associated engine. The FADEC includes function generators that issue the torque commands as a function of outside ambient conditions. The torque commands are continuously updated for changing ambient conditions. Further, takeoff torque can be corrected for heating conditions. The power management system can also provide torque commands as a linear function of power lever angle.

28 Claims, 6 Drawing Sheets

POWER MANAGEMENT SYSTEM FOR TURBINE ENGINES

FIELD OF THE INVENTION

The present invention relates in general to power management systems for turbine engines and in particular to an automatic single lever power management system for turboprop engines.

BACKGROUND OF THE INVENTION

In conventional power management systems for turboprop engines, each engine is controlled by two levers: a speed lever and a power lever. The speed lever is coupled to a propeller governor. By adjusting the speed lever, a pilot can command the propeller governor to a desired speed. The propeller governor maintains the engine at the fixed speed by adjusting propeller blade angle. The power lever is coupled to a hydromechanical metering unit or digital engine control. In response to the angle of the power lever, the hydromechanical metering unit or digital engine control adjusts engine power by adjusting fuel flow or gas generator speed.

Much of the pilot's time is spent adjusting the engine to the required torque for specific operating conditions. Torque is a function of ambient conditions including temperature, altitude and mach number. Typically, the pilot looks at a flight manual for the torque for the day and adjusts the respective levers to obtain the power required for takeoff. The pilot sets the speed lever to a preset engine speed. Then, the pilot adjusts the power lever. As the power lever is advanced with the speed lever in a set position, the hydromechanical metering unit increases engine fuel flow within predetermined limits or the digital engine control increases gas generator speeds. For example these limits prevent compressor stall and combustor flameout. The power turbine is increased until the set point of the propeller governor is reached, at which time the propeller governor begins to adjust blade angle to hold the propeller at a fixed speed. Fuel flow is increased until the desired torque for the day is obtained, while blade angle is adjusted by the propeller governor to hold the propeller speed.

Once the aircraft has taken off and reached a cruising altitude, the pilot readjusts engine speed and torque to cruise levels. However, prior to adjusting the engine speed, the pilot reduces engine power to avoid overtorque or overtemperature conditions. Once engine power is low enough to safely adjust engine speed, the pilot iteratively adjusts the speed lever and observes an RPM gauge until the desired speed for cruise is reached. Then, engine torque is readjusted. Once again, the pilot refers to the flight manual to obtain the cruise torque at the prevalent ambient conditions. Then, he closes the loop on torque by iteratively adjusting the power lever.

As gas generator speed and/or fuel flow is being adjusted, the pilot must compensate for certain time constants associated with the engine. The steady-state torque level is not evident until the time constants associated with the propeller governor have washed out. Therefore, the pilot must close the loop on torque by watching a torque gauge and iteratively adjusting the power lever to obtain the desired torque at the ambient conditions.

Further, the pilot must compensate for changes in ambient conditions. As these conditions change, the desired torques also change. Unless the pilot adjusts the power lever, the engine is forced to operate at lower efficiency.

Changes in ambient conditions also affect the predictability of engine power. The engine requires more fuel to reach one hundred percent torque on a hot day than on a cold day. Therefore, on one day, the power lever angle required for one hundred percent torque might be different than the power lever angle on another day. As a consequence, the pilot cannot set the power lever to a known angle. Instead, the pilot must watch the torque gauge and iteratively adjust the power lever until the engine operates at one hundred percent torque.

The pilot must spend additional time adjusting the power lever during descent. Descent rate is directly affected by flight idle fuel flow provided by the hydromechanical metering unit. The flight idle fuel flow is preset achieve an optimal descent rate. However, at a fixed power lever angle, engine power varies as a function of altitude. Thus, the engine power changes as the aircraft descends and, as a result, the descent of the aircraft is not maintained at a constant rate. If a constant descent rate is required, the pilot must continuously adjust the power lever to maintain the requisite descent rate.

Finally, pilot workload is increased as a consequence of the engine power being unpredictable. Changes in ambient conditions affect the fuel flow required to obtain a given torque. For example, the engine requires more fuel flow to reach one-hundred percent power on a hot day than on a cold day. Therefore, the power lever angle required for one-hundred percent torque can vary from day to day. Because the pilot never knows the exact angle at which he can obtain one hundred percent power, he must iteratively adjust the power lever until such a power level is reached.

It is apparent that these procedures entail considerable pilot workload during critical phases of flight, including significant "heads down" activity.

SUMMARY OF THE INVENTION

Pilot workload is reduced by a power management system according to the present invention. The power management system controls speed and torque of at least one turbine engine means which provides a mode signal indicating one of a plurality of modes of operation; and at least one control means. Each control means includes torque command means for each engine which generates torque commands in response to the mode signal, and speed command means, which selects speed commands in response to the mode signal.

Pilot workload is further reduced because the power management system rescales the power lever quadrant to provide predictable engine torques as a function of power lever angle. In one embodiment, the target torque means provides first and second torque requests, which correspond to respective first and second positions on a power lever quadrant. The torque requests are supplied to torque scheduling means, which generates torque commands as a function of power lever angle.

The power management system also allows the torque for the day to be corrected for heating conditions. First, the correct outside ambient temperature is determined. Then, a correction signal indicating the corrected temperature is supplied to the function generator means in place of the input signal indicating outside ambient temperature. The resulting torque request is saved and outputted as the torque for the day.

DETAILED DESCRIPTION OF THE PREFERRED EMBODIMENT

Figure 1:
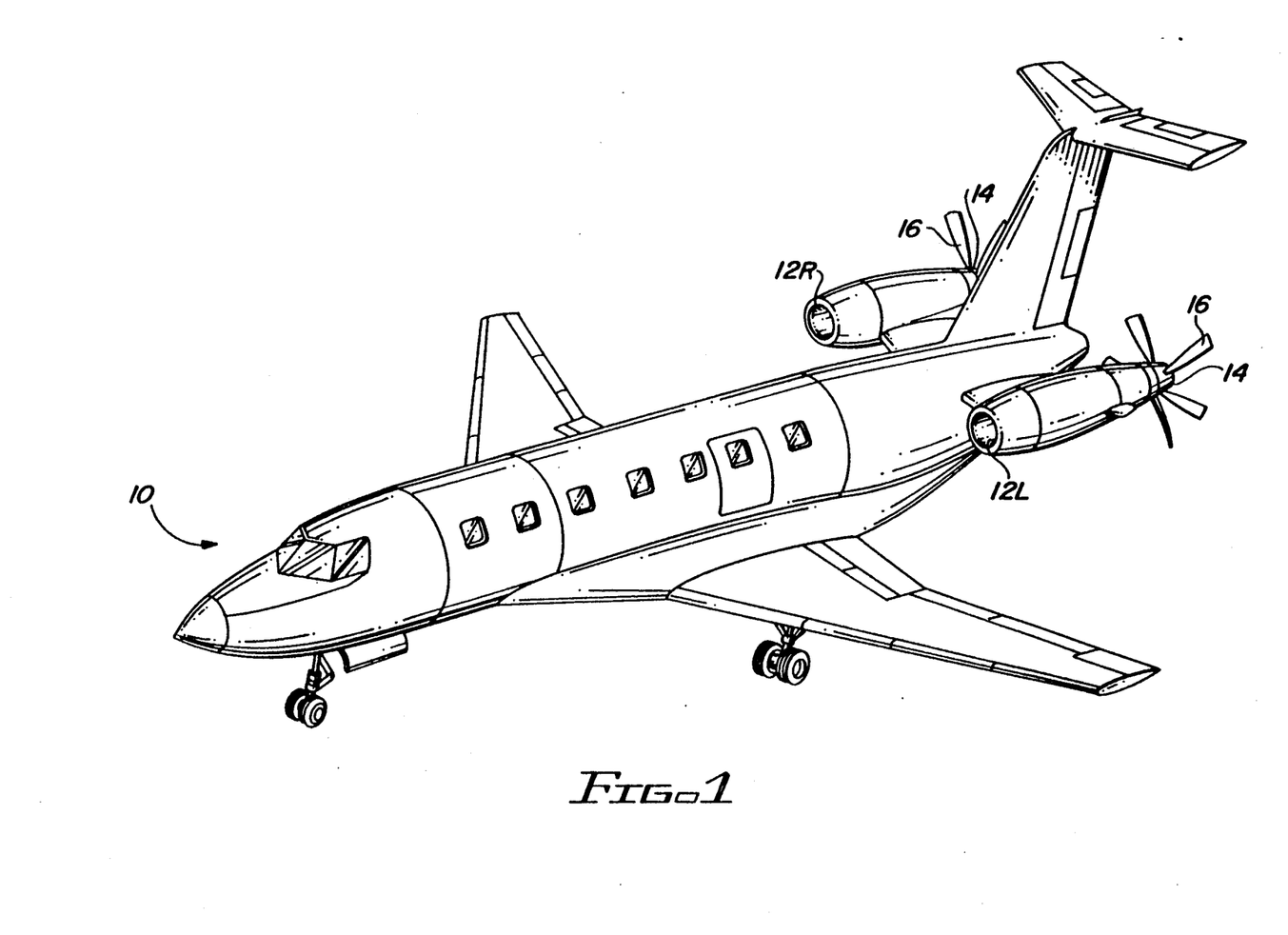
FIG. 1 is a pictorial view of an aircraft having twin turboprop engines.

Referring to FIG. 1, there is shown an aircraft 10 having twin turbo prop engines: a left engine 12L and a right engine 12R. Each engine 12L and 12R has a turbine-type power plant that includes a compressor section (not shown), combustion section (not shown) and a turbine section (not shown). These sections are arranged in serial flow relation. A spinner 14 is connected to the aft end of each engine 12L and 12R. A plurality of propeller blades 16 are circumferentially disposed about the spinner 14 and extend radially therefrom. Air that enters each engine 12L and 12R is compressed in the compressor section. The compressed air is discharged to the combustion section, where the air is mixed with fuel. The mixture is ignited to produce hot expanding gases that turn the turbine section, which, in turn, drives the propeller blades 16. The propeller blades 16 move a mass of cold air to create a thrust. The thrust produced by the propeller blades 16 is varied by changing their pitch. The pitch is changed by rotating the blades 14 about their longitudinal axes.

The power management system according to the present invention can control an aircraft having any number of turbine engines. For each engine, the power management system provides at least one full authority digital engine control (FADEC). The FADEC provides commands to its corresponding engine for controlling propeller speed and fuel flow. Thus, to control the aircraft 10 depicted in FIG. 1, the power management system would employ two FADECS: one FADEC for controlling the left engine 12L and another FADEC for controlling the right engine 12R.

Figure 2:
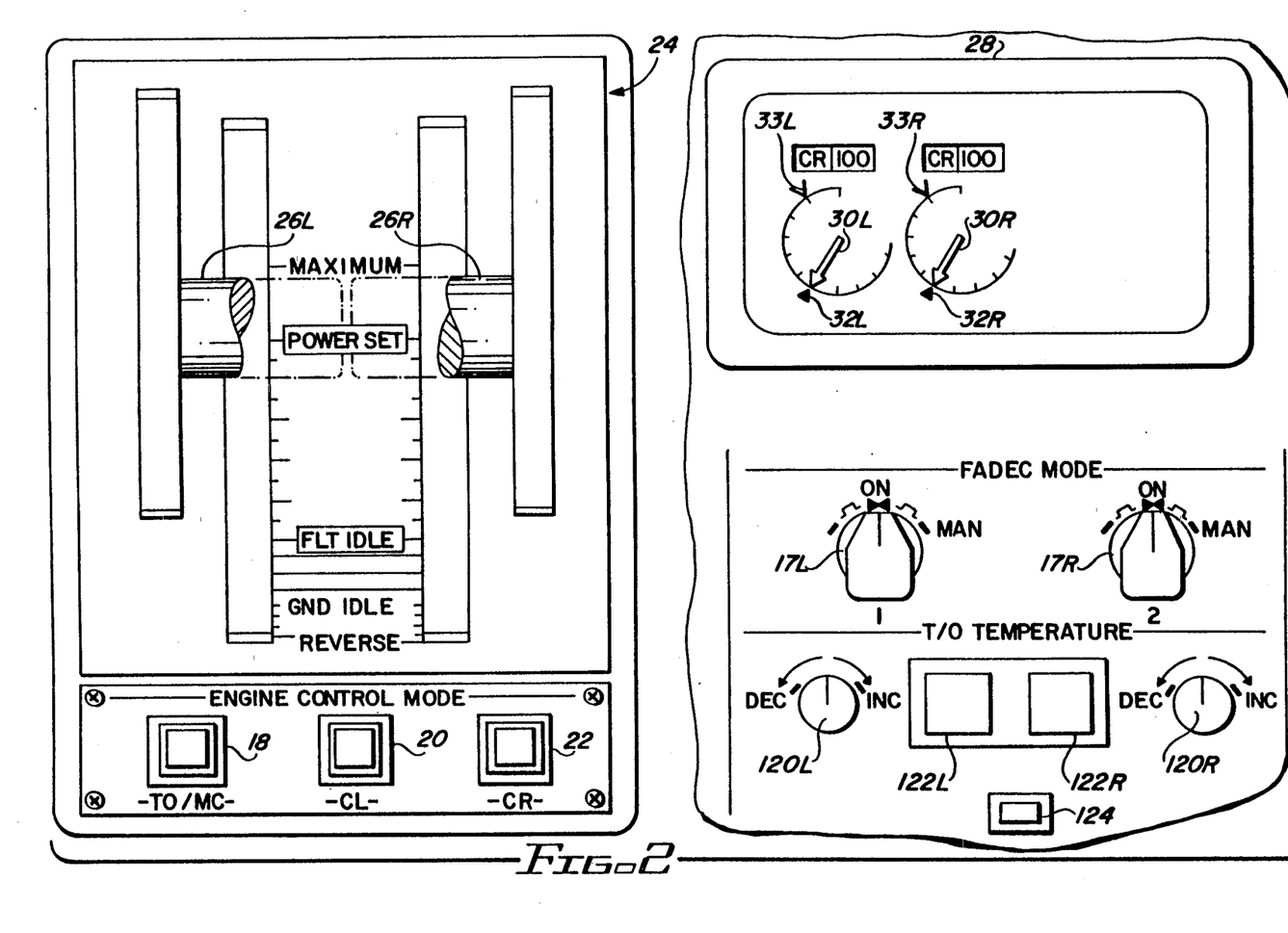
FIG. 2 is a schematic diagram of cockpit controls for a power management system according to the present invention.

Referring now to FIG. 2, the cockpit controls include FADEC mode switches 17L and 17R, which control the mode of the power management system. When the switches 17L and 17R are set to auto mode, the FADECS are enabled to control the engines 12L and 12R.

The cockpit controls further include flight mode switches 18, 20 and 22 for takeoff, climb and cruise, respectively. Propeller speed is selected in accordance with the flight mode. During takeoff, for example, the pilot depresses the flight mode switch 18 for takeoff. Each flight mode switch 18, 20 and 22 has two contacts that feed the two FADECS simultaneously, allowing both engines 12L and 12R to respond at the same time.

The cockpit controls further include a power lever quadrant 24, which has left and right power levers 26L and 26R for controlling power demands of the left and right engines 12L and 12R, respectively. The left and right power levers 26L and 26R can be moved independently between five designated positions on the power lever quadrant 24: Revere (located at zero degrees on the power lever quadrant 24); Ground Idle (fifteen degrees); Flight Idle (thirty five degrees); Power Set (eighty five degrees); and Maximum (one hundred and five degrees).

Each FADEC calculates target torques for the Flight Idle and Power Set positions. Target torques are calculated as a function of outside ambient temperature, altitude and mach number and are updated on a continual basis. When the left and right power levers 26L and 26R are set at the Power Set position, a target torque for either takeoff, climb or cruise is provided, depending upon the flight mode selected by the flight mode switches. Thus, the flight mode switches 18, 20 and 22 also function to select target torques for the Power Set position.

Also found in the cockpit is an Engine Indication Crew Alerting System (EICAS) 28. For each engine 12L and 12R, the EICAS 28 displays actual engine torque via torque gauges 30L and 30R. Further, the EICAS 28 displays commanded torques via "torque request bugs" 32L and 32R. Still further, the EICAS 28 displays target torques via "target torque bugs" 33L and 33R.

When the aircraft 10 is ready for takeoff, the pilot moves the left and right power levers 26L and 26R to the Power Set position. Detents (not shown) locate the power levers 26L and 26R at this position. Then, the pilot depresses the flight mode switch 18 for takeoff. The FADECS provide torque commands corresponding to takeoff torque for the day.

As the aircraft climbs to 2000 feet and then to a cruising altitude, the pilot transitions from takeoff to climb to cruise simply by depressing the flight mode switches 18, 20 and 22, respectively. In response to each selection, the FADECS provide the target torques for climb and cruise respectively. These torques are based upon prevailing ambient conditions and are updated continuously for changing conditions. The target torques are maintained via closed loop control. This is all accomplished with the power levers 26L and 26R in the Power Set position. Thus, the torque gauges 30L and 30R and their corresponding torque request bugs 32L and 32R are always aligned. The pilot need not adjust the power levers 26L and 26R for changing outside ambient conditions. The target torques are automatically calculated. The pilot need only verify the torque of the day with the flight manual.

At the beginning of descent, the pilot pulls back the left and right power levers 26L and 26R to the Flight Idle position until the FADECS command torques that cause the aircraft 10 to descend at an acceptable rate. Because each FADEC updates the torque levels for changing ambient conditions, constant thrust is maintained and, as a result, the left and right power levers 26L and 26R need not be adjusted.

The FADECS also rescale the power lever quadrant 24 to allow for predictable power levels at known positions of the power levers 26L and 26R. For power lever angles between thirty five degrees and eighty five degrees, the FADECS command a torques that are linearly interpolated from the torques corresponding to the Flight Idle and Power Set positions. For power lever angles below thirty five degrees, respective engine fuel flows are modulated to maintain a constant 62% propeller speed. Engine power is commanded as a linear function of power lever angle Flight Idle and Power Set positions.

For power lever angles above eighty five degrees (i.e., when maximum power is needed), torque is increased linearly as a function of power lever angle until maximum power is obtained. Maximum power is defined by either the aircraft flat rate limit or the temperature redline, which is calculated by the FADECS.

At all angles of the power levers 26L and 26R, the FADECS maintain the commanded torques via closed loop control.

Figure 3:
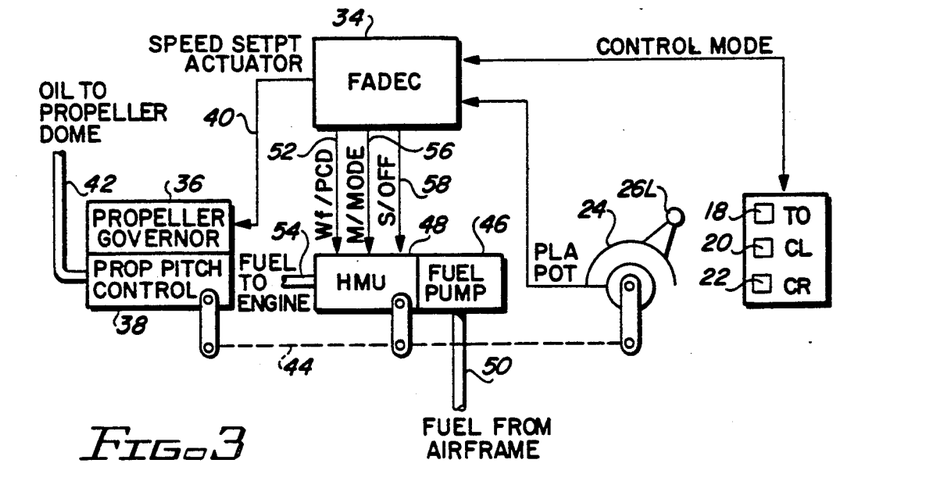
FIG. 3 is a block diagram of a FADEC and associated control apparatus for controlling a turboprop engine, which FADEC and control apparatus form a part of the power management system according to the present invention.

Referring now to FIG. 3, there is shown a FADEC and associated apparatus for controlling the engine speed and fuel flow of the left engine 12L of the aircraft 10. This FADEC is denoted by the reference numeral 34. The FADEC and its associated apparatus for controlling the the right engine 12R are identical to that for controlling the left engine 12L. Therefore, only the FADEC and associated apparatus for controlling the right engine will be described.

Figure 4:
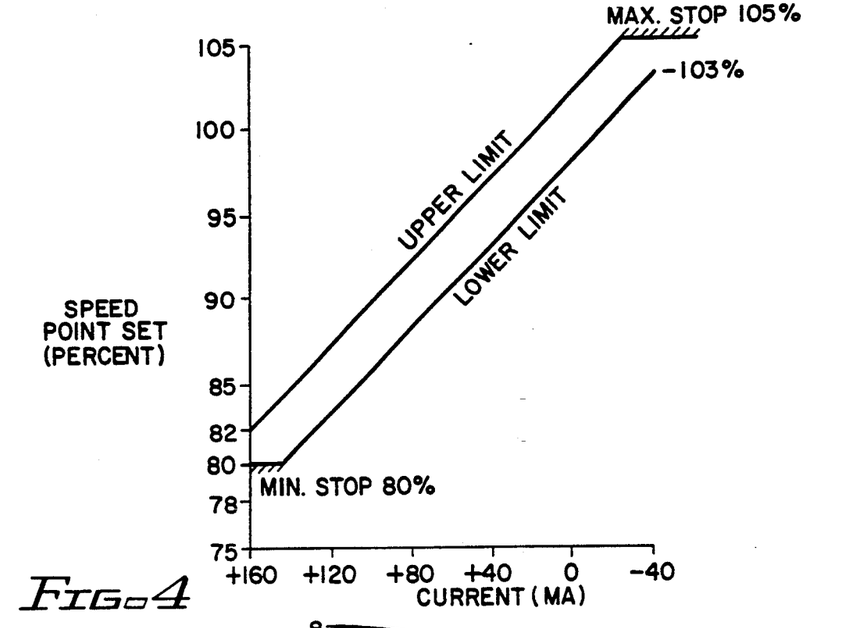
FIG. 4 is a plot of speed set point versus current for a propeller governor.

The apparatus for controlling speed of the left engine 12L includes a propeller governor 36 and a propeller pitch control 38. Mounted external to the gearbox of the left engine 12L, the propeller governor 36 operates the engine at a target speed by regulating the flow of engine lubricating oil to a propeller dome. The propeller governor 36 has a flyweight (not shown) which coacts with a spool valve (not shown) to regulate the pressure of the oil. A speed set-point actuator (not shown) controls the position of the flyweight to establish the target speed for the propeller. Target speed, expressed as a percentage of maximum rated engine speed, is a function of input current. See, for example, the graph of FIG. 4 (speed set point versus input current). The input current is supplied to the set point actuator by the FADEC 34 over a conductor 40. When propeller speed is under the commanded setpoint, the propeller governor 36 increases pressure to the propeller dome. Propeller blade angle is reduced and, as a result, engine speed is increased. When propeller speed is above the commanded setpoint, the propeller governor 36 reduces oil pressure to the propeller dome in order to increase propeller blade angle. As a result, engine speed is reduced.

Engine oil flows from the propeller governor 36 to the propeller pitch control 38, which is mounted within the gearbox of the left engine 12L. The propeller pitch control 38 provides an oil transfer tube 42 that allows oil to flow from the propeller governor 36 to the propeller dome. The flow of oil through the oil transfer tube 42 is regulated by a valve (not shown). The valve is manually controlled by the left power lever 26L via a mechanical cable 44. The propeller pitch control 38 provides a minimum blade angle stop. For example, when the power lever 26L is moved to the Power Set position (i.e. eighty-two degrees on the power lever quadrant 24), the minimum blade angle is set at 14.7 degrees. The propeller governor 36 and propeller pitch control 38 are conventional units, which are well known to those skilled in the art.

The apparatus for controlling fuel flow to the left engine 12L includes a fuel pump 46 that supplies fuel to a hydromechanical metering unit (HMU) 48. The fuel pump 46 draws fuel from the airframe of the aircraft 10 over a first fuel line 50. Discharge flow to the hydromechanical metering unit 48 is a function of gas generator speed.

Figure 5:
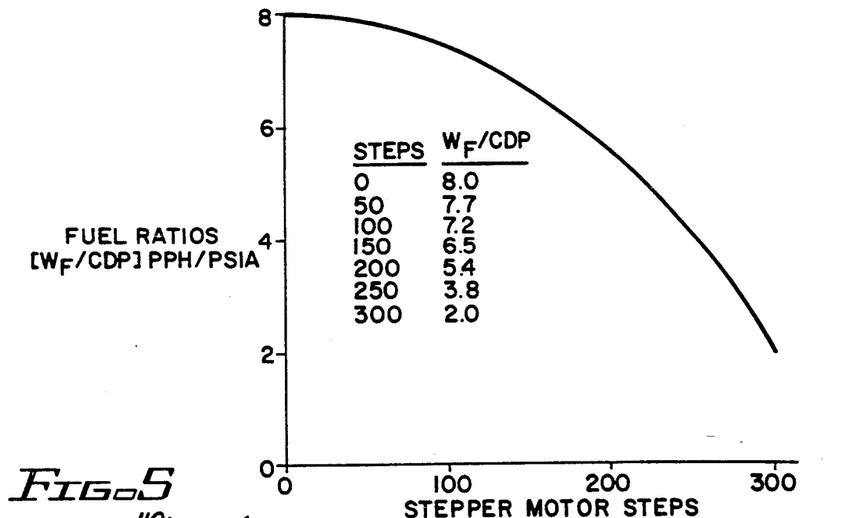
FIG. 5 is a plot of Wf/PCD ratio versus stepper motor steps for a hydromechanical metering unit.

The HMU 48 meters the flow of fuel to the left engine 12L. In auto mode, the HMU 48 meters fuel flow based upon a ratio of fuel flow to compressor discharge pressure (Wf/PCD). The FADEC 34 commands the ratio Wf/PCD to the HMU 48 over conductor 52. See, for example, the graph of FIG. B (ratio Wf/PCD versus stepper motor steps). As the ratio changes, the FADEC 34 updates the stepper motor command. Compressor discharge pressure (PCD) is provided by the left engine 12L. The HMU 48 meters the fuel flow based upon the compressor pressure discharge (PCD) and delivers the metered fuel flow (Wf) to the left engine 12L via a second fuel line 54. The fuel pump 46 and HMU 48 are conventional units that are well known to those skilled in the art.

To operate the hydromechanical metering unit 48 in manual mode, the FADEC 34 deactivates the manual mode solenoid (not shown) via conductor 56 and stops updating the stepper motor. The ratio Wf/PCD ratio is determined by the angle of the left power lever 26L. The power lever angle is provided to the HMU 48 by the mechanical cable 44. Metered fuel flow (Wf) is delivered to the left engine 12L in accordance with the compressor pressure discharge (PCD). The HMU 48 is also provided with a solenoid for fuel shutoff (not shown). This solenoid is controlled by the FADEC 34 over conductor 58.

The FADEC 34 includes a Military Standard 1750 microprocessor. Because this type of microprocessor is well known, a description of its architecture is not necessary. It should be noted, however, that the FADEC 34 can be realized by microprocessors other than the Military Standard 1750 (e.g., commercially-available microprocessors). The FADEC 34 also includes electronic memory for storing a microprocessor program, and variables that are utilized during the various operations performed by the FADEC 34. The electronic memory can include RAM, EEPROM and UVPROM. Variables are also supplied to the FADEC 34 via a keyboard (not shown).

The microprocessor program realizes the functions described in FIGS. 6-10. These functions can be programmed by a person skilled in the art.

Figure 6:
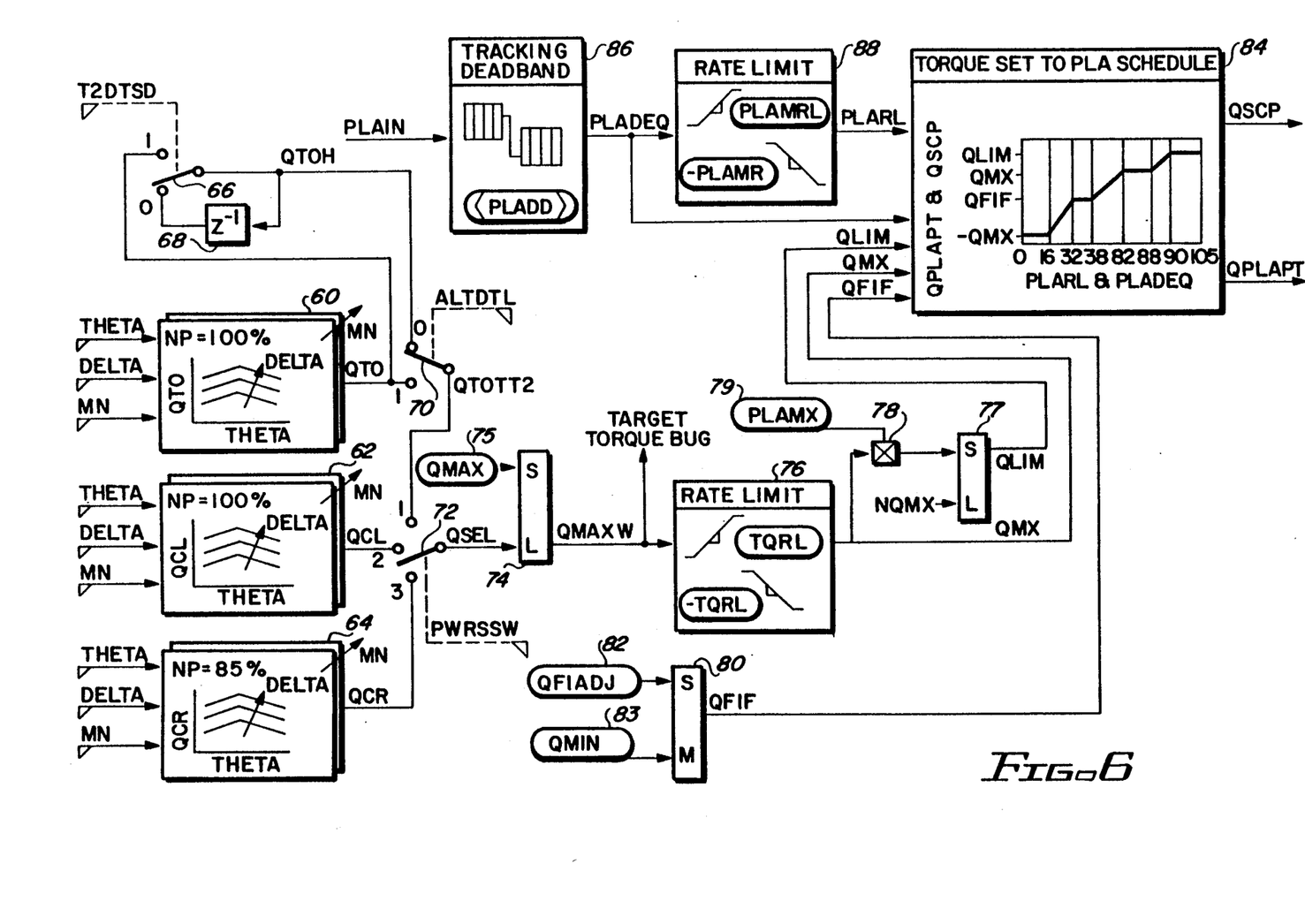
FIG. 6 is a diagram of torque set logic, which forms a part of the FADEC.

Referring now to FIG. 6, there is shown torque set logic, which formulates torque commands QPLAPT and QSCP. The torque set logic includes first, second and third function generators 60, 62 and 64, which provide signals QTO, QCL and QCR indicative of target torques for takeoff, climb and cruise, respectively. In general, target torque is the torque promised to the customer for specific aircraft applications under a set of ambient conditions including outside temperature, altitude and mach number. Each engine has unique sets of target torques QTO, QCL and QCR for takeoff, climb and cruise; thus, every aircraft has unique target torques. These target torques are provided to the customer in the form of a manufacturer spec model. Fom this model, the customer creates a pilot's handbook. The handbook includes, for example, the graph of FIG.

Figure 7:
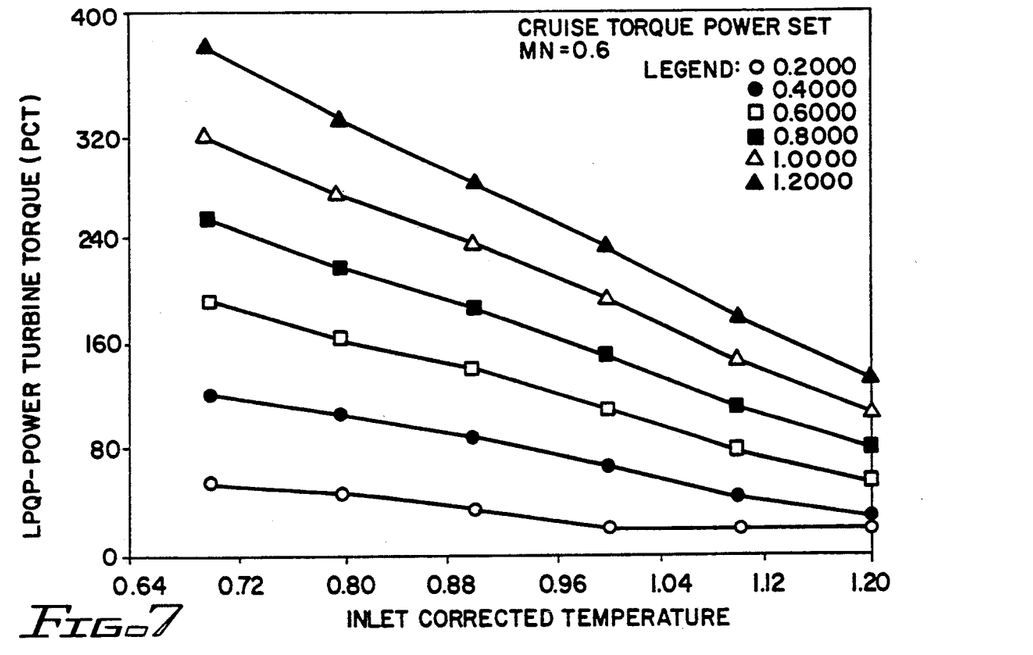
FIG. 7 is a graph of ideal cruise torques for temperatures at six different altitudes, all at mach number 0.6.

7, which shows cruise target torques for temperatures at six different altitudes, all at mach number 0.6. Target torques are expressed as a percentage of maximum rated power. Inlet corrected temperature is expressed as a ratio of outside ambient temperature (in degrees Rankine) over temperature for a standard day (519 degrees Rankine). Altitude data is expressed as a ratio of ambient pressure (in psia) over pressure at sea level (14,692 psia). Torque is expressed as a percentage of aircraft flat rate. Similarly, the handbook provides graphs for mach numbers 0.0, 0.2, 0.4, and 0.8.

The spec model also generates target torques for the function generators 60, 62 and 64. The target torques are stored in the function generators 60, 62 and 64 as sets of discrete points. In the graph shown in FIG. 7, for example, thirty six different ideal torques can be taken for mach number 0.6. Similarly, thirty six points can be taken from each of the graphs for mach numbers 0.0, 0.2, 0.4, and 0.8. Thus, each function generator 60, 62 and 64 requires a storage capacity of at least 180 bytes for target torques. Each function generator 60, 62 and 64 is supplied with input signals THETA, DELTA and MN for outside ambient temperature, altitude and mach number, respectively. In response to these signals THETA, DELTA and MN, the function generators 60, 62 and 64 provide signals QTO, QCL and QCR. As the ambient conditions change, so too do the signals QTO, QCL and QCR provided by the function generators 60, 62 and 64. Thus, each function generator 60, 62 and 64 includes a three-dimensional table that indicates a target torque based upon signals THETA, DELTA and MN indicative of ambient outside temperature, pressure altitude and mach number. For input signals THETA, DELTA and MN that fall between the discrete points, each function generators 60, 62 and 64 performs a triple interpolation to derive the corresponding target torques. Triple interpolation routines are well known to those skilled in the art. So too are three-dimensional function generators.

It should be noted that the target torques are also a function of propeller speed. For the function generators 60, 62 and 64, however, propeller speeds are preselected. For example, propeller speeds are preselected at 100%, 100% and 85% for takeoff, climb and cruise, respectively. Thus, the function generators 60, 62 and 64 already account for propeller speed. Otherwise, four-dimensional function generators would be required.

The first, second and third function generators 60, 62 and 64 are in software, and implemented within the FADEC 34. Alternately, the first, second and third function generators 60, 62 and 64 can be realized by ROM lookup tables. Storage capacity is a function of the number of torques that are provided. For instance, a greater number of torques would require greater storage capacity. However, a greater number of torques would also increase the accuracy of the target torque by reducing error attributed to triple interpolation.

Each function generator 60, 62 and 64 continuously updates the signals QTO, QCL and QCR. The update rate is dependant upon the rate at which the input signals THETA, DELTA and MN are supplied to the function generators 60, 62 and 64. The inputs THETA, DELTA and MN are supplied to each function generator 60, 62 and 64 at a rate that adequately reflects changes in ambient conditions. Such a rate can be 5 Hz. For an example of a routine that provides the input signals THETA, DELTA and MN to the function generators 60, 62 and 64, see applicants' No. 07/761,606 copending application filed concurrently herewith and entitled "METHOD FOR MATCHING ENGINE TORQUES FOR MULTIPLE ENGINE AIRCRAFT". This application is incorporated herein by reference.

Prior to takeoff, the ambient outside temperature must be corrected for heating conditions. Takeoff torque signal QTO must also reflect this correction. Prior to the outside ambient temperature being corrected, a first switch 66 couples an output of the first function generator 60 to a first delay element 68. Thus, the takeoff torque signal QTO reflecting the uncorrected outside ambient temperature is stored in the first delay element 68 and updated on a continual basis until the temperature is corrected, whereupon a signal T2DTSD is issued. The signal T2DTSD indicates that the corrected temperature has been supplied to the first function generator 60. The signal T2DTSD causes the first switch 66 to decouple the first function generator 60 from the first delay element 68. As a result, the first delay element 68 is no longer updated, and the takeoff torque signal reflecting the corrected outside ambient temperature, altitude and mach number at the time of correction is stored in the first delay element 68. The signal T2DTSD also causes the first switch 66 to couple its output to an output of the first delay element 68. The output of the first switch 66 provides the signal QTOH, which is the takeoff torque corrected for temperature.

The takeoff torque signals QTO and QTOH are supplied to respective inputs of a second switch 70, which is responsive to a signal ALTDTL indicative of aircraft altitude. When the altitude of the aircraft 10 is below a predetermined altitude, such as 2000 feet, the second switch 70 selects the takeoff torque signal QTOH provided by the first delay element 68 (i.e., the corrected takeoff torque signal). However, when the aircraft 10 climbs above predetermined altitude, the signal ALTDTL causes the second switch 70 to select the takeoff torque signal QTO provided by the first function generator 60. Thus, the second switch 70 outputs a signal QTOTT2 that is fixed until the aircraft 10 climbs above the predetermined altitude. Then, the second switch 70 outputs a signal QTOTT2 is updated with prevailing ambient conditions.

Outputs of the second switch 70 and second and third function generators 62 and 64 are coupled to respective inputs of a third switch 72. The third switch 72 selects a torque signal QTOTT2, QCL or QCR in response to a signal PWRSSW indicating the flight mode selected by the pilot. For example, when the pilot depresses the flight mode switch 18 for cruise, the signal PWRSSW causes the third switch 72 to select the cruise torque signal QCR. An output of the third switch 72 provides a selected torque signal QSEL. In this manner, the flight mode switches 18, 20 and 22 function to select a torque command.

A first select-least switch 74 functions to limit the torque signal QSEL selected by the third switch 72 to a value QMAX, which is stored in memory location 75. The value QMAX is typically 100%. One output of the first select-least switch 74 supplies a torque signal QMAXW to the cockpit. There, the torque signal QMAXW is displayed by the target torque bug 33L as the target torque. Another output of the first select-least switch 74 provides the torque signal QMAXW to a first rate limiter 76. The first rate limiter 76 prevents sudden changes in the torque signal QMAXW by limiting the changes to a rate TQRL such as three percent torque per second. For instance, a sudden change in the torque signal QMAXW occurs during the transition from climb to cruise. Thus, the first rate limiter 76 allows for a smooth transition. An output of the first rate limiter 76 provides the target torque signal QMX.

The torque set logic also calculates an upper limit torque signal QLIM. A first multiplier 78 multiplies the flight torque signal QMX by a constant PLAMX, which is stored in memory location 79. A function of maximum allowable torque on the gearbox, the constant PLAMX has a value ranging from one to two. If, for example, the constant PLAMX is equal to 1.1 and target torque signal QMX equals 99%, upper limit torque signal QLIM equals 99%. Select-least block 77 limits torque signal QLIM to a value NQMX, such as 100%. An output of the select-least block 77 provides the torque signal QLIM.

The torque set logic further provides a torque signal QFIF for flight idle. An apriori value QFIADJ is selected for flight idle torque. When the engines 12L and 12R operate at the apriori value QFIADJ, the resulting thrusts cause the aircraft 10 to descend at a predetermined rate. The apriori value QFIADJ is dependant upon the aerodynamic efficiency (e.g., drag) of the aircraft 10. For high drag, the engine thrust must be positive; otherwise the aircraft 10 would descend at too fast a rate. As the aerodynamic efficiency of the aircraft 10 increases, the corresponding engine thrust is decreased. Thus, zero or negative thrusts can be expected for an aircraft 10 having a high aerodynamic efficiency. The correct thrust and corresponding engine torques can be determined during flight tests. However, due to mechanical considerations in the gearbox, there is a lower limit on the flight idle torque. The lower limit is indicated by the value QMIN. Therefore, a first select-most switch 80 selects the greater of the apriori value QFIADJ and the value QMIN from memory locations 82 and 83, respectively. An output of the first select-most switch 80 provides the flight idle torque signal QFIF.

Still referring to FIG. 6, there is shown a fourth function generator 84, which provides torque commands QPLAPT and QSCP as linear functions of power lever angle. The inputs to the fourth function generator 84 include the upper limit torque signal QLIM, which is provided by select-least block 77, the target torque signal QMX, which is provided by the first rate limiter 76, and the flight idle torque signal QFIF, which is provided by the first select-most switch 80. Two additional input signals PLADEG and PLARL are supplied to the fourth function generator 84. These signals indicate power lever angle of the left power lever 26L. An unfiltered digital signal PLAIN that indicates power lever angle is supplied from the left power lever 26L via a potentiometer and A/D converter (not shown). The digital signal PLAIN is supplied to a filter tracking deadband 86. The filter 86 is a low pass filter that removes noise in the digital signal PLAIN and, thereby stabilizes the power lever angle to a value PLADB such as 0.3 degrees. Noise, manifested as small movements in the power lever angle, can be caused by vibrations of the left power lever 26L. A signal PLADEG provided on an output of the filter 86 is supplied to a second rate limiter 88, which limits sudden changes in the power lever angle signal PLADEG to a value PLAMRL, such as degrees per second. An output of the second rate limiter 88 provides a signal PLARL, which indicates the rate-limited power lever angle. The signals PLARL and PLADEG are supplied to respective inputs of the fourth function generator 84. The fourth function generator 84 calculates the torque command QPLAPT as a linear function of the rate-limited power lever angle signal PLARL, and it calculates the torque command QSCP as a linear function of power lever angle signal PLADEG.

The fourth function generator 84 has a curve comprising seven slopes S1, S2, S3, S4, S5, S6 and S7. Four of the slopes S1, S3, S5 and S7 are flat. The first slope S1 corresponds to the Reverse position on the power lever quadrant 24. Thus, for power lever angles between zero and fifteen degrees, the fourth function generator 84 issues respective torque commands QSCP and QPLAPT whose values equal torque signal -QMX. The third slope S3 corresponds to the Flight. Idle position on the power lever quadrant 24. Thus, for power lever angles between thirty two and thirty eight degrees, the fourth function generator 84 issues respective torque commands QSCP and QPLAPT whose values equal flight idle torque signal QFIF. The fifth slope S5 corresponds to the Power Set position on the power lever quadrant 24. Thus, for power lever angles between eighty two and eighty eight degrees, the fourth function generator 84 issues respective torque commands QSCP and QPLAPT whose values equal the target torque signal QMX. The target torque signal QMX is equal to torques for either takeoff, climb or cruise, depending upon the flight mode switch 18, 20 or 22 that is selected. The seventh slope S7 corresponds to the Maximum position on the power lever quadrant 24. Thus, for power lever angles between ninety and one hundred and five degrees, the fourth function generator 84 provides torque commands QSCP and QPLAPT whose values equal the upper limit torque signal QLIM. Flat slopes S1 and S7 are provided to compensate for backlash in the mechanical cable 44 connecting the power lever 26L with the HMU 48. Flat slopes S3 and S5 are provided at the Flight Idle gate and the Power Set detent to prevent the pilot from setting power half-way through the gate or detent.

The remaining slopes S2, S4 and S6 are linearly interpolated from the input torque signals QLIM, QMX and QFIF. The second slope S2 corresponds to a power lever position between Reverse and Flight Idle on the power lever quadrant 24. Thus, for power lever angles between fifteen and thirty two degrees, the fourth function generator 84 provides respective torque commands QSCP and QPLAPT that are linearly interpolated between torque signal -QMX and flight idle torque signal QFIF. The fourth slope S4 corresponds to power lever angles between the Flight Idle and Power Set positions. Thus, for power lever angles between thirty eight and eighty two degrees, the fourth function generator 84 provides torque commands QSCP and QPLAPT that are linearly interpolated between the flight idle torque signal QFIF and target torque signal QMX. The sixth slope S6 corresponds to power lever angles between the Power Set and Maximum positions. Thus, for power lever angles between eighty eight and ninety degrees, the fourth function generator 84 provides torque commands that are linearly interpolated between the flight torque signal QMX and the upper limit-torque signal QLIM. Small oscillation due to phenomena such as vibrations do not cause corresponding changes in the torque commands QSCP and QPLAPT that are linearly interpolated. The filter 86 rejects these small oscillations The number of slopes employed by the fourth function generator 84 is purely a function of design. For instance, the flat slopes S1, S3, S5 and S7 can be eliminated, thereby leaving three slopes that are interpolated between zero and thirty-two degrees, thirty-five and eighty five degrees and eighty-five and one hundred and five degrees. The profile of each slope is also a function of design, and depends upon the algorithm employed for interpolating torques between two power lever angles.

Torque commands QSCP provided by the fourth function generator 84 are supplied to the cockpit for display by the torque request bugs 32L. These commands represent the unfiltered, real power lever angle indicated by signal PLADEG. Torque commands QPLAPT generated by the fourth function generator 84 are supplied to the torque control loop as setpoints.

Thus, the fourth function generator 84 of the FADEC 34 rescales the power lever quadrant 24 to provide predictable torque commands QPLAPT for known positions of the left power lever 26L. If data is supplied to the left and right FADECS in accordance with applicants' copending application entitled "METHOD FOR MATCHING ENGINE TORQUES FOR MULTIPLE ENGINE AIRCRAFT", both the left and right FADECS will receive the same set of input data (e.g., temperature, altitude and mach number), Thus, matched positions of the left and right power levers 26L and 26R will result in matched engine torques.

Figure 8:
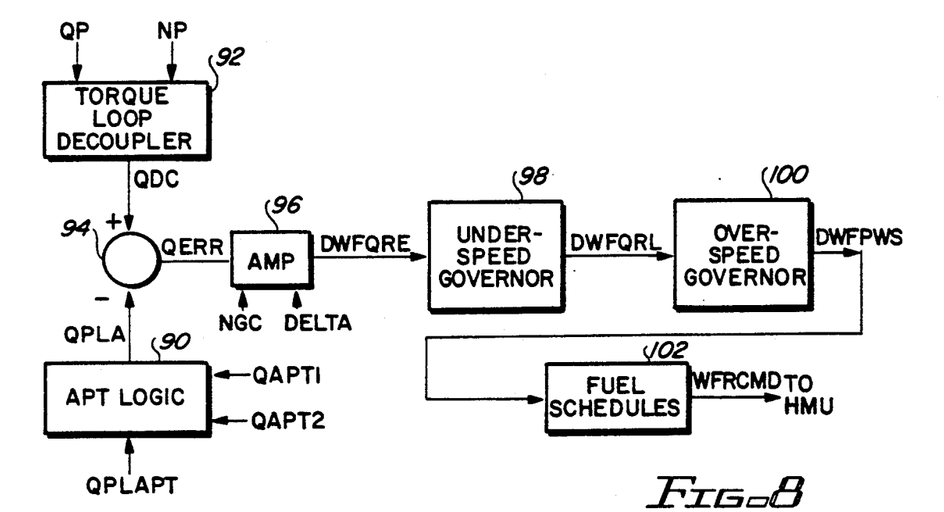
FIG. 8 is a block diagram of the closed loop torque control for the FADEC.

Referring now to FIG. 8 there is shown a block diagram of the closed loop control for torque. The torque set logic supplies the torque command QPLAPT to Autopilot Trim (APT) logic 90. During approach, the autopilots provide delta torque commands QAPT1 and QAPT2 that adjust the torque command QPLAPT to keep the aircraft 10 on a constant glide slope required by the airport. The APT logic 90 trims the delta torque commands QAPT1 and QAPT2 to keep the aircraft 10 at a constant airspeed during approach. An output of the APT logic 90 provides a trimmed torque command QPLA. APT logic 90 is disclosed in applicants' copending application No. 07/762,670 filed concurrently herewith and entitled "APPARATUS FOR TRIMMING AUTOPILOT COMMANDS".

A torque loop decoupler 92 decouples the torque loop from the speed loop to allow only the speed loop to react to rapid changes in propeller speed. A signal QP indicative of torque measured from the propeller is provided to one input of the torque loop decoupler 90. A signal NP indicative of propeller speed is supplied to another input. Outputted by the torque loop decoupler 92 is a decoupled torque signal QDC that indicates turbine torque. The decoupled torque signal QDC remains constant for rapid changes in engine speed. The torque loop decoupler 92 is disclosed in applicants' copending application No. 07/762,324 filed concurrently herewith and entitled "TORQUE LOOP DECOUPLER FOR TURBOPROP ENGINES".

An error signal QERR drives the closed loop control for torque. The error signal QERR is generated by a second subtracter 94, which takes the difference between the decoupled torque signal QDC and the trimmed torque command QPLA. It should be noted that the APT logic 90 does not have to be employed in the closed loop control; the torque command QPLAPT can be supplied to the subtrahend input of the subtracter 94 instead of the trimmed torque command QPLA.

An amplifier 96 amplifies the error signal QERR by a gain that is a function of gas generator speed NGC and altitude DELTA. As the gas generator speed (i.e., engine power) changes, the time constant of the engine also changes. To obtain optimum time response, the gain of the closed loop control is adjusted. The same is true of altitude. Because the engine time constant changes as a function of altitude, the gain of the closed loop control is modified. The amplifier 96 also filters the error signal QERR to remove its high frequency content. The filter has a cutoff frequency of 10 Hz. The output of the amplifier 96 provides a delta fuel torque ratio DWFQRE.

An underspeed governor 98 prevents engine blowout by setting a lower limit for the delta fuel torque ratio DWFQRE. The lower limit is established by a gas generator underspeed governor and a propeller underspeed governor. An output of the underspeed governor 98 provides a delta fuel torque request DWFQRL.

An overspeed governor 100 sets an upper limit for the delta fuel torque ratio DWFQRL. The upper limit is established by the following: a propeller overspeed governor; T45 Power set, which limits fuel flow to prevent the interturbine temperature from exceeding a redline temperature; and a gas generator power set, which limits fuel flow as a function of power lever angle. An output of the overspeed governor 100 provides a delta fuel torque request DWFPWS.

Fuel schedules 102 convert the delta fuel torque request DWFPWS to a fuel flow command WFRCMD. Included in the fuel schedules are the following: a Required-to-Run, which provides a correction term to the delta fuel flow request DWFPWS that enables the engine to operate on its ideal operating line; acceleration schedules, which convert the delta torque fuel request DWFPUS to a fuel flow request that prevents the engine from exceeding its surge line; a transient temperature limiter, which limits the fuel flow request during the initial stages of an acceleration; a deceleration schedule, which provides a lower limit for fuel flow to prevent engine blowout during engine deceleration; and an automatic specific gravity adjustment, which aids in driving the fuel flow command WFRCMD to the required-to-run line and compensates for any variation in fuel burn efficiencies of the engine. The fuel schedules 102 further include autostart and enrichment, which override the fuel flow request during startup. An output of the fuel schedules 102 supplies the fuel flow command WFRCMD to the stepper motor of the HMU 48.

The gas generator underspeed governor, propeller underspeed governor, gas generator power set, T45 power set, propeller overspeed governor, required-to-run, acceleration schedules, transient temperature limiter, auto start, enrichment, deceleration schedule and auto specific gravity trim are all well known to those skilled in the art.

Figure 9:
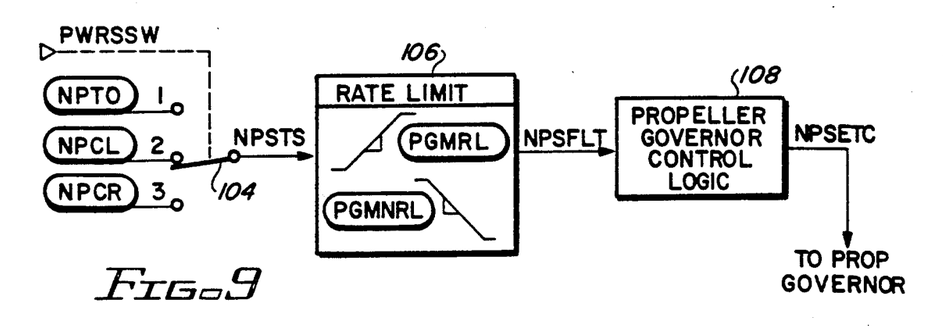
FIG. 9 is a block diagram of propeller speed logic.

Referring now to FIG. 9, there is shown a diagram of propeller speed logic, which provides a speed command NPSETC to the speed setpoint actuator of the propeller governor 36. Supplied from the cockpit is the signal PWRSSW indicating the flight mode (e.g., takeoff, climb and cruise) selected by the pilot. In response to the signal PWRSSW, a fourth switch 104 selects a speed from one of three memory locations NPTO, NPCL and NPCR, which store speeds for takeoff, climb and cruise, respectively. Engine speeds are stored as percentages of maximum rated engine speed. Exemplary values for the takeoff, climb and cruise speeds are one hundred percent, one hundred percent and eighty five percent, respectively. An output of the fourth switch 104 provides the speed command NPSTS. A rate limiter 106 limits the change in the speed command NPSTS to a rate PGMRL such as ±6.0% per second. Thus, the rate limiter 106 allows for a smooth transition in propeller speeds when the pilot switches the flight modes from climb to cruise. An output of the rate limiter 106 provides the target speed command NPSFLT.

Propeller governor control logic 108 can also be employed with the propeller speed logic. The propeller governor control logic 108 prevents the error in the propeller governor 36 from causing a difference between the target speed command NPSFLT and the signal NP indicating propeller speed. Further, the propeller governor control logic 108 prevents the engine 12L from overshooting its target speed. An output of the propeller governor control logic 108 supplies the speed command NPSETC to the propeller governor 36. The propeller governor control logic 108 is disclosed in applicants' copending application No. 07/762,756 filed concurrently herewith and entitled "PROPELLER GOVERNOR CONTROL FOR TURBOPROP ENGINES".

The power management system can also be operated in manual mode. Either the FADEC 34 can select manual mode based upon faults to the power management system, or the pilot can select manual mode from the cockpit.

In one mode of operation, the pilot has manual control of the HMU 48 (i.e., control of fuel flow), while the FADEC 34 remains in control of the propeller governor 36. This mode is entered when a failure does not affect the setting of propeller speed. Such instances include failures of the gas generator speed monopole or the HMU stepper motor. The mechanical cable 44 coupling the power lever 26L to the HMU 48 enables the pilot to control the gas generator speed set by the HMU 48. Full power is available in this mode; thus, the aircraft is dispatchable in this configuration. However, the engine 12L is operated as that of a turboprop with a conventional power management system. The selection of flight mode switches 20 and 22 for climb and cruise only affect the propeller speed. The pilot must control engine torque through the power lever 26L. Thus, the pilot must perform the closed loop torque operation by adjusting the power lever 26L and monitoring the torque gauge 30L. To insure there are no overtorques as the engine 12L changes speed, the power lever 26L must be pulled back before either climb or cruise modes is selected. Further, takeoff power is now at various locations on the power lever quadrant 24. The location depends upon prevailing ambient conditions. The target torque is displayed on the EICAS 28 by the target torque bug 33L as long as it can be accurately calculated by the FADEC 34 (i.e., as long as the FADEC inputs used for the Target Torque calculation are valid). It is desirable that the pilot not have to use the flight manuals to determine the torque of the day. The torque request bug 32L is no longer displayed since the FADEC 34 is no longer controlling to torque.

In another mode of operation, the FADEC 34 relinquishes total control of both the HMU 48 and the propeller governor 36. Due to multiple failures of various system inputs and outputs, or due to a total failure of the electrical system, the FADEC 34 cannot control fuel flow and propeller speed. Under these conditions, the propeller governor 36 defaults to 100% speed setting, and the pilot controls the HMU 48 (i.e., the gas generator speed) via the power lever 26L. In this mode, there is no limiting of engine torque or temperature since these functions are performed only when the FADEC 34 controls fuel flow. Consequently, the pilot must be aware of the operating limitations of the engine 12L, and he must insure that the limitations are not exceeded. It should be mentioned that the probability of entering this mode of operation is extremely remote since it is unlikely that more than one failure would occur.

The pilot can select manual mode from the cockpit via FADEC mode switch 17L. When manual mode is selected, the pilot controls the HMU 48 via the power lever 26L. Resulting is the typical non-linear relationship between engine power and power lever angle. Further, the pilot controls the propeller speed via the flight mode switches 18, 20 and 22. Propeller speed is operated at 100% when either the takeoff or climb switches 18 or 20 is depressed, and 85% when the the cruise switch 22 is depressed.

Figure 10:
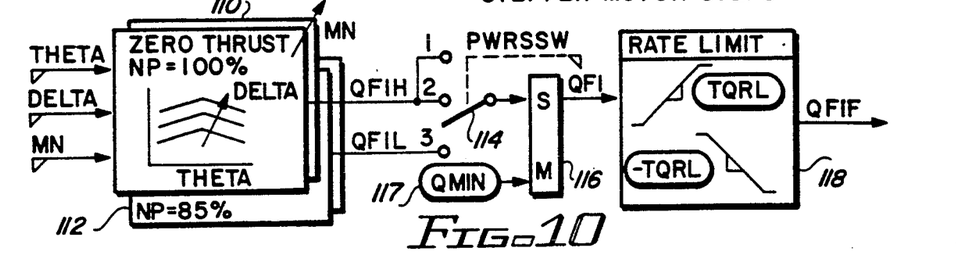
FIG. 10 is a diagram of a preferred embodiment of flight idle torque logic.

Referring now to FIG. 10, there is shown a preferred embodiment of flight idle logic. One consequence of using an apriori value QFIADJ for flight idle torque is that the propeller thrust is subject to move around when the ambient conditions change. Therefore, the rate of descent may change with changing ambient conditions. To overcome this problem, the apriori value QFIADJ is replaced by fifth and sixth function generators 110 and 112, which supply flight idle torques as a function of ambient conditions.

In order to obtain constant descent rates, the fifth and sixth function generators 110 and 112 are programmed with maps of flight idle torque as a function of propeller speed and ambient conditions. In response to input signals THETA, DELTA and MN for temperature, altitude and Mach Number, respectively, the fifth and sixth function generators 110 and 112 provide torque signals QFIH and QFIL. The input signals THETA, DELTA and MN and, therefore, the torque signals QFIH and QFIL are updated at a rate that adequately reflects changes in ambient conditions. Thus, the torque signals QFIH and QFIL cause a constant propeller thrust as the aircraft 10 descends.

Both the fifth and sixth function generators 110 and 112 are programmed with curves taken from the propeller manufacturer. These curves provide a thrust as a function of outside ambient temperature, altitude and mach number. The desired thrust, which can be positive, negative or zero, is dependant upon the desired rate of descent and upon the aerodynamic efficiency of the aircraft 10. The fifth and sixth function generators 110 and 112 are similar to the first, second and third function generators 60, 62 and 64 described in connection with FIG. 6.

As previously noted, required or desired torque is also a function of propeller speed. When only two propeller speeds are required for descent (e.g., eighty five percent speed and one hundred percent), the fifth function generator 110 provides torque signals QFIH for propeller speeds of one hundred percent and the sixth function generator 112 provides torque signals QFIL for propeller speeds of eighty five percent. The signal PWRSSW indicating the selected flight mode causes a fifth switch 114 to select an output of either the fifth or sixth function generator 110 or 112. When the flight mode switches 18 or 20 for takeoff or climb are selected, the torque signal QFIH provided by the fifth function generator is supplied to a second select-most switch 116. When the flight mode switch 22 for cruise is selected, the torque signal QFIL provided by the sixth function generator 112 is supplied to the second select-most switch 116. The second select-most switch 116 prevents the selected flight idle torques from falling below a minimum value QMIN, such as six percent. The value QMIN is stored in memory location 117. The second select-most switch 116 supplies a torque signal QFI to a fourth rate limiter 118, which limits the change in torque signal QFI to a rate TQRL such as three percent per second. An output of the fourth rate limiter 118 provides the flight idle torque signal QFIF, which is supplied to the fourth function generator 84 (see FIG. 6).

Figure 11:
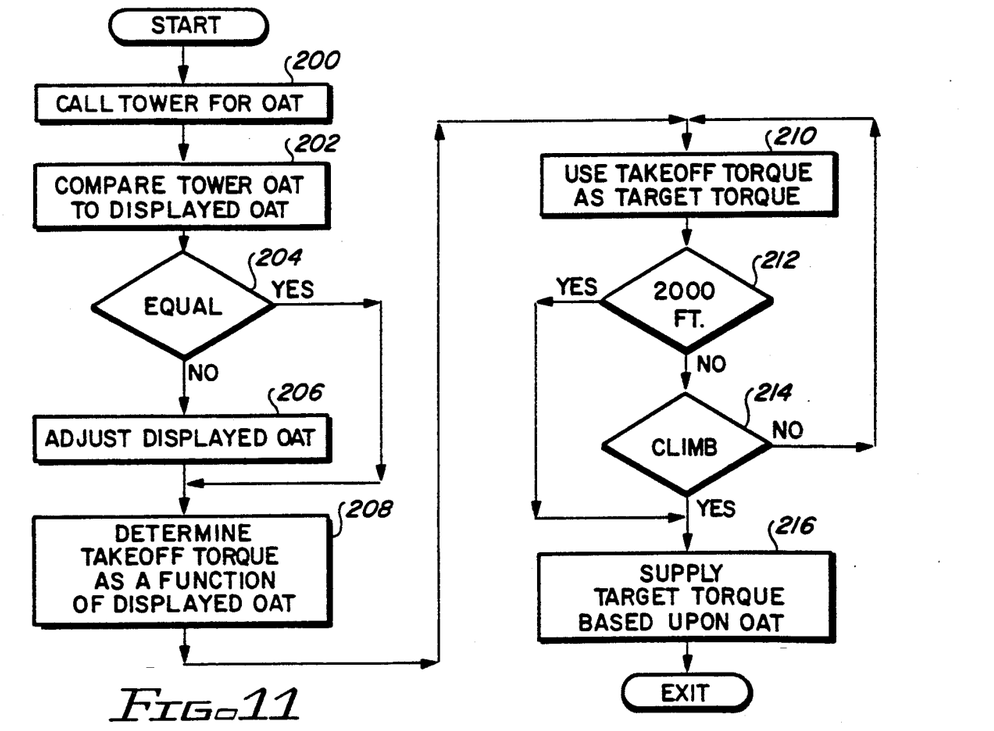
FIG. 11 is a flowchart of a routine for correcting takeoff torque for heating conditions.

With reference to FIG. 11, a routine to correct takeoff torque for heating conditions is now described. For takeoff, the pilot must obtain an accurate reading for torque for the day. This reading is based partly upon outside ambient temperature, which is measured at the engine inlet. However, due to heating conditions (e.g., engine soakback, tarmac radiation), the measured temperature may not be accurate. Therefore, the pilot must adjust the measured temperature within predetermined limits.

Prior to takeoff, the pilot calls into the tower for the correct outside ambient temperature (module 200). The pilot then compares the correct outside ambient temperature, provided by the tower, to the outside ambient temperatures measured by the engine sensors and displayed on respective readouts 120L and 120R in the cockpit (module 202). If the temperatures displayed on the readouts 120L and 120R differ from the temperature provided by the tower (module 204), the pilot adjusts the displayed temperatures. He does so by adjusting increment/decrement switches 122L and 122R until the displayed temperatures match the temperature provided by the tower (module 206). Temperatures can be adjusted at a rate such as of one degree per second and limited to a change such as ±6 degrees Celsius. After adjusting the temperatures, the pilot depresses a store button 124, which causes the signal T2DTSD to be issued. In response to this signal, the displayed temperature is supplied to the first function generator 60 where it is used for determining the takeoff torque (module 208). The takeoff torque based upon the displayed temperature is used as the target torque (module 210) until the aircraft 10 climbs to 2000 feet above ground level (module 212) or until the flight mode switch 22 for climb is selected (module 214). Then, the FADEC begins to use the actual outside air temperature in the target torque calculations (module 216).

Thus disclosed is an automatic single lever power management system for an aircraft having multiple turboprop engines. Among its advantages, overall aircraft weight and rigging complexity is reduced. Rigging complexity is tied to engine/aircraft maintenance. Through the FADEC, improvements in operability, reduction in pilot workload and engine maintenance are realized.

It will be understood that the embodiments described herein are merely exemplary and that a person skilled in the art may make many variations and modifications without departing from the spirit and scope of the invention. The present invention can be modified for use with any type of turbine engine. For example, if the present invention is used to control turbofan engines, a closed loop control for fan speed achieves the target thrust. Or, if the present invention is used to control turbojet engines, a closed loop control for thrust achieves the target thrusts. All such modifications are intended to be included within the scope of the invention as defined in the appended claims.

What is claimed is:

1. A power management system for at least one turbine engine, comprising:
    indicating means for providing a mode signal indicating a selected one of a plurality of modes of operation; and
    at least one engine control means for providing torque and speed commands to a corresponding turbine engine, each said engine control means including:
    torque command means, responsive to said mode signal, for generating said torque commands; and
    speed command means, responsive to said mode signal, for selecting said speed commands from a plurality of apriori values of engine speeds, each said value corresponding to a mode of operation.

2. A power management system according to claim 1, wherein each engine is a turboprop engine, and wherein said modes of operation are flight modes.

3. A power management system according to claim 1, wherein said speed command means includes:
    a plurality of storage means for storing said apriori values; and
    selecting means, responsive to said mode signal, for selecting a value from said plurality of storage means according to the mode selected, an output of said selecting means providing said speed commands.

4. A power management system according to claim 1, wherein said indicating means includes:
    at least one switch for each mode of operation; and
    means, responsive to the selection of said switches, for providing said mode signal.

5. A power management system according to claim 1, wherein said torque command means includes:
    at least one function generator corresponding to each mode of operation, each function generator providing target torque requests; and
    selection means, responsive to said mode signal, for selecting target torque requests from said function generators, an output of said selection means providing said torque commands.

6. A power management system according to claim 5, further including input means for generating input signals indicative of ambient conditions, wherein said function generators provide said target torque requests in response to said input signals.

7. A power management system according to claim 1, further including power lever means for each said engine, each said power lever means including a power lever and means for providing a pla signal indicating power lever angle; and wherein said torque command means includes:
    target torque means for providing first and second target torque requests; and
    torque scheduling means, responsive to said pla signals and said first and second target torque requests, for generating said torque commands as a function of power lever angle.

8. A power management system according to claim 7, wherein each said torque scheduling means outputs said first target torque requests as said torque commands when its corresponding pla signal indicates a power lever angle at a first position; wherein said torque scheduling means outputs said second target torque requests as said torque commands when said corresponding pla signal indicates a power lever angle at a second position; and wherein said torque scheduling means interpolates said torque commands between said first and second target torque requests when said pla signal indicates a power lever angle between said first and second positions.

9. A power management system according to claim 8, wherein said torque scheduling means interpolates said torque commands as a linear function of power lever angle.

10. A power management system according to claim 9, wherein said target torque means includes means for generating maximum target torque requests as a function of said first target torque requests; and
  wherein said torque scheduling means provides said maximum target torque request when said pla signal indicates a power lever angle at a third position, which is above said first and second positions.

11. A power management system according to claim 10, wherein said torque scheduling means linearly interpolates said torque commands between said first and maximum target torque requests when said pla signal indicates a power lever angle between said first and third positions.

12. A power management system according to claim 11, wherein said torque scheduling means linearly extrapolates said torque commands when said pla signal indicates a power lever angle below said second position.

13. A power management system according to claim 7, wherein each said power lever means further includes filtering means, operative on said pla signal, for removing high frequency components from said pla signal.

14. A power management system according to claim 11, wherein said torque scheduling means includes flats at said first, second and third positions.

15. A power management system according to claim 7, wherein said target torque means provides apriori values as said second target torque requests.

16. A power management system according to claim 7, wherein said target torque means includes a first flight idle function generator for providing flight idle torque orders for a corresponding propeller speed.

17. A power management system according to claim 16, wherein said target torque means further includes:
  at least one additional flight idle function generator for providing flight idle torque orders for corresponding propeller speeds; and
  flight idle selecting means for selecting an output of said flight idle function generators, an output of said selecting means providing said second target torque requests.

18. A power management system according to claim 17, further including means for providing input signals indicative of temperature, altitude and mach number, wherein said flight idle function generators generate said flight idle torque orders in response to said input signals.

19. A power management system according to claim 6, wherein said input means provides input signals indicative of temperature, altitude and mach number.

20. A power management system according to claim 19, wherein said torque commands are generated also as a function of engine speed.

21. A power management system according to claim 3, wherein said speed command means further includes rate limiting means, operative on said speed command, for limiting the rate at which said speed commands change values.

22. Apparatus for generating torque and engine speed commands for a turboprop engine in response to a mode signal indicating a selected one of a plurality of operating modes, said apparatus comprising:
  at least one function generator corresponding to each mode of flight, each function generator providing target torque requests in response to input signals indicating temperature, altitude and mach number;
  first selecting means, responsive to said mode signal, for selecting target torque requests from said function generators;
  supplying means, responsive to said first selecting means, for supplying said selected target torque requests as said torque commands;
  storing means for storing apriori values of engine speeds corresponding to said modes of operation; and
  second selecting means, responsive to said mode signal, for selecting said values from said storing means according to the mode selected, an output of said second selecting means providing said engine speed commands.

23. Apparatus according to claim 22, wherein said at least one function generator includes a first function generator for providing target torque requests for takeoff, and wherein each said engine control means further includes:
  overriding means, responsive to a cockpit signal, for overriding said input signal indicating temperature with a second signal indicating a corrected temperature; and
  saving means, responsive to said cockpit signal, for saving a first target torque request generated by said first function generator, wherein said first selecting means selects an output of said saving means when takeoff is indicated by said mode signal and when an altitude signal indicating a predetermined altitude is not issued, and wherein said first selecting means selects said output of said first function generator when said altitude signal is issued and said mode signal indicates takeoff.

24. Apparatus according to claim 22, further comprising:
  power lever means for providing a pla signal indicating power lever angle;
  idle command means for providing flight idle torque requests; and
  wherein said supplying means includes torque scheduling means, responsive to said pla signal, for outputting said target torque requests from said first selecting means when said pla signal indicates a power lever angle at a first position and for outputting said flight idle torque requests when said pla signal indicates a power lever angle at a second position, an output of said torque scheduling means providing said torque commands.

25. Apparatus according to claim 24, wherein said torque scheduling means linearly interpolates said torque commands when said pla signal indicates a power lever angle between said first and second positions.

26. Apparatus according to claim 25, wherein said idle command means includes:

at least two function generators for generating flight idle torque orders for corresponding propeller speeds; and third selecting means for selecting an output of said at least two function generators, an output of said third selecting means providing said flight idle torque requests.

27. Apparatus according to claim 25, wherein said idle command means provides an apriori value as said flight idle torque request.

28. A power management system according to claim 8, further including at least one set of sensor means associated with each turbine engine for generating input signals indicating ambient conditions; and providing means for providing the same set of input signals to each said engine control means; and wherein said target torque means includes at least one function generator for providing said first target torque requests in response to said input signals provided by said providing means, whereby matching power lever angles produce matching torque commands for said engines.

* * * * *